United States Patent
Yamana et al.

[11] Patent Number: 5,853,646
[45] Date of Patent: Dec. 29, 1998

[54] MOLDING METHOD AND DILUTION AGENT FOR MOLD RELEASING AGENT

[75] Inventors: Masayuki Yamana; Tsukasa Aga, both of Settsu, Japan

[73] Assignee: Daikin Industries, Ltd., Osaka, Japan

[21] Appl. No.: 737,136

[22] PCT Filed: May 8, 1995

[86] PCT No.: PCT/JP95/00876

§ 371 Date: Nov. 7, 1996

§ 102(e) Date: Nov. 7, 1996

[87] PCT Pub. No.: WO95/31321

PCT Pub. Date: Nov. 23, 1995

[30] Foreign Application Priority Data

May 11, 1994 [JP] Japan ................................ 6-121949

[51] Int. Cl.$^6$ .................................................. B29C 33/58
[52] U.S. Cl. ...................................... 264/338; 106/38.22
[58] Field of Search ........................... 106/38.22, 38.24; 264/338; 252/9, 11

[56] References Cited

U.S. PATENT DOCUMENTS

| 3,893,868 | 7/1975 | Klement et al. | 264/338 |
| 4,118,235 | 10/1978 | Horiuchi et al. | 264/338 |
| 5,601,774 | 2/1997 | Kohama et al. | 264/338 |

FOREIGN PATENT DOCUMENTS

| 0 597 115 A1 | 5/1994 | European Pat. Off. |
| 3-234509 | 10/1991 | Japan |
| 3-78244 | 12/1991 | Japan |
| 5-301228 | 11/1993 | Japan |
| WO 93/22121 | 11/1993 | WIPO |

*Primary Examiner*—Mathieu D. Vargot
*Attorney, Agent, or Firm*—Armstrong, Westerman, Hattori, McLeland & Naughton

[57] ABSTRACT

A molding method in which a mold releasing agent is diluted by a water solution containing a surfactant, when the mold releasing agent is diluted by water to be used for molding. The molding method can be provided to obtain good wettability to the metal mold, drying ability and mold releasability always with good reproducibility.

4 Claims, 1 Drawing Sheet

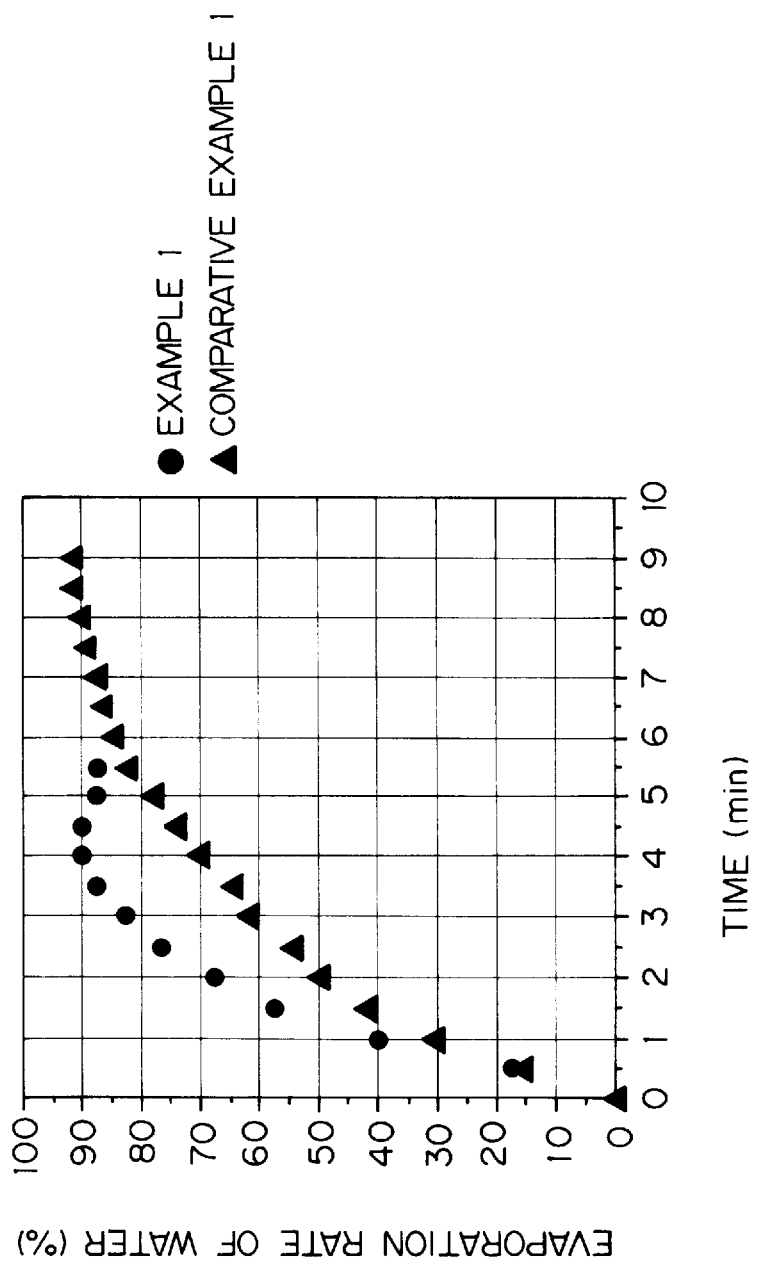

MOLDING METHOD AND DILUTION AGENT FOR MOLD RELEASING AGENT

INDUSTRIAL FIELDS WHERE THE INVENTION CAN BE UTILIZED

The present invention relates to a molding method wherein resin, rubber and so on are molded by a metal mold using a water-based mold releasing agent, and relates to a dilution agent for a mold releasing agent which is used for the molding method.

PRIOR ART

Ordinally, in order to obtain a molded article of resin, rubber and so on, first of all, a mold releasing agent is coated on a metal mold and molding compositions is put therein so that the molding compositions is turned to a solid molded article, then the solid molded article is released from the metal mold.

There are many kinds of mold releasing agents to be used for such molding, for example, a wax-type, a silicone-type, a fluorine-containing-type and so on, and these agents, when used, are in the forms dispersed or dissolved in an organic solvent or water.

A mold releasing agent of the organic solvent is generally easy to use because the wettability to the metal mold and drying ability are good based on the property of the organic solvent.

But, a water-based mold releasing agent has been strongly requested to be used in view of recent global environments and working environments, because of the problems, for example, of the destruction of the ozone layer by trichlorotrifluoroethane (Flon 113), the poisoning by a chlorine-containing solvent, the flammablility and poisoning by a petroleum-based solvent.

On the other hand, a water-based mold releasing agent is ordinary used in a manner that it is diluted to a suitable concentration with water at its using sites when it is used.

But, the mold releasing agent based on the organic solvent has been generally used when the temperature of the metal mold is not more than 100° C., because water has larger evaporation latent heat and poorer drying property than the organic solvent. And, in the case of diluting, it tends to considerably lower the mold releasability than the mold releasing agent based on the organic solvent.

With regard to this, a molding method in which mold releasing agent is diluted with the surfactant and water to prepare water-based molding agent for use has been known (Japanese Patent Publication No. 32513/1984, and Japanese Patent Publication No. 26601/1989). In this case, the drying ability and the mold releasability are improved, and it can be used under the low temperature such as under a low temperature of not more than 100° C., compared with the case of dilution by only water.

It is understood that this is because the diluted water-based mold releasing agent contains a surfactant, the wettability to the mold is improved, and because the mold releasing agent does not form a drop-like shape of water, it becomes a uniform thin membrane to improve the drying ability. Simultaneously with those, the mold releasability and the mold contamination are improved.

However, it is generally used as the mold releasing agent, for example, wax, silicone oil, silicone resin or perfluoroalkyl-containing compound emulsioned by a surfactant.

Accordingly, because the surfactant is contained in the mold releasing agent before diluting, it is generally seemed to be the same as the case of dilution by only water, but in the actual molding process, the optimal dilution ratio is generally changed according to the difference of molding compositions or the shape of the metal mold even in the case of using the same mold releasing agent. So, the wettability to the mold has been largely different according to the dilution ratio. This is also appeared in the molding method in which the mold releasing agent is diluted for using by a surfactant and water, as disclosed in Japanese Patent Publication No. 32513/1984 and Japanese Patent Publication No. 26601/1989.

OBJECTIVES OF THE INVENTION

An object of the present invention is to provide a molding method in which good wettability to the mold, drying ability and mold releasability can be always obtained with good reproducibility, and to provide a dilution agent for a mold releasing agent which is used for the above molding method.

THE CONSTITUTION OF THE INVENTION

That is, the present invention relates to a molding method in which a mold releasing agent is diluted for using by a dilution agent consisting of water solution containing a surfactant when the mold releasing agent is diluted by water to be used for the molding, and relates to a dilution agent for the mold releasing agent which consists of a water solution containing 0.01 to 5% by weight of the surfactant, which is used for the above molding method.

According to the molding method and the dilution agent of the present invention, because the dilution agent contains the surfactant, the wettability to the mold is improved, and because the mold releasing agent does not form a drop-like shape of water, it becomes a uniform thin membrane so that the drying ability can be improved, at the same time, the mold releasability and the mold contamination can be improved too.

Moreover, because the surfactant can be beforehand contained into the dilution agent in the optimal concentration, the dilution ratio (the dilution concentration) can always be set at a desirable value, and the wettability to the mold would not change. Accordingly, it is possible to freely select the most suitable dilution ratio adjusted according to the difference of the molding composition or the shape of the mold, and the above wettability, the drying ability and the mold releasability can be always improved with good reproducibility.

In the present invention, the mold releasing agent to be diluted is not limited particulary, but a wax-type, a silicone-type, a fluorine-containing-type and so on can be exemplified as follows:

As the wax-type, for example, an animal wax, a plant wax, a mineral wax, a synthetic wax (an ester wax of fatty acid, an amide wax of fatty acid, a polyethylene wax, a micro wax, a paraffin wax and so on) can be given.

As the silicone-type, for example, dimethylsilicone oil, methyl-phenylsilicone oil, aminoalkyl-denaturated diorganosiloxane, silicone resin and so on can be given.

As the fluorine-containing-type, there can be given the compounds containing perfluoroalkyl group or perfluoroalkenyl group, for example, phosphoric acid ester or the salt containing perfluoroalkyl group or perfluoroalkenyl group, carboxylic acid or the salt containing perfluoroalkyl group or perfluoroalkenyl group, sulfonic acid or the salt containing perfluoroalkyl group or perfluoroalkenyl group, acryl-type polymer containing perfluoroalkyl group or perfluoroalkenyl group and so on.

And the mold releasing agent can be ordinarily used in the forms of the emulsion or the dispersion prepared by utilizing the surfactant. As the surfactant which can be used, the surfactant of ordinal anion, cation, nonion and amphote can all be given, and as follows.

The anionic sufactant: higher fatty acid alkaline salt, alkyl sulfate, alkyl sulfonate, alkyl-aryl sulfonate, alkyl phosphoric acid ester, fluorine-containing carboxylic acid, fluorine-containing sulfonic acid and so on.

The cationic surfactant: higher amine halogenate, halogenized alkyl pyridinium, quarternary ammonium salt, polyoxy-ethylene alkyl amine and so on.

The nonionic surfactant: polyoxy-ethylene alkyl ether, polyoxy-ethylene alkyl ester, sorbitan alkyl ester, sugar ester and so on.

The amphoteric surfactant: it contains the type of betain, imidazorine and so on. There are the type of secondary or tertiary amine, and quarternary ammonium salt and so on. As an anion group, carboxylic acid, sulfuric acid ester, sulfonic acid, phosphoric acid ester and so on are usuful.

As the surfactant contained in the dilution agent used in the present invention, any of anion, cation, nonion and amphote can be used, but the ionic surfactant such as the anionic surfactant, the cationic surfactant, and the amphoteric surfactant are sometimes coagulated when mixed with another ion. For example, in the case of using the anionic sufactant as the emulsifier of the mold releasing agent, if the cationic sufactant is used as the dilution agent, the state of emulsion may be unstable and the good coating may not be obtained.

However, in the case of using the nonionic surfactant, because there is no influence as above mentioned, the nonionic surfactant can be used in all cases in good condition, so the nonionic surfactant is preferable.

Among the nonionic surfactants, in the view that the mold releasabitily is not deteriorated, the compound shown by the following general formula is preferable:
General fomula

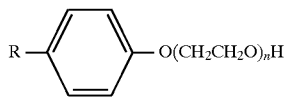

(R is an aliphatic hydrocarbon group represented as $C_mH_{2m+1}$ (m is 5–20 of integral number), for example $C_8H_{17}$- or $C_9H_{19}$-, n is 2–100 of integral number). And the compound can be used as one sort, or by mixing more than two sorts.

This surfactant is on the market, but according to the present invention, the mold releasing agent is not used to be diluted by only water, but by a water solution (dilution agent) containing the surfactant. The concentration of the surfactant in the dilution agent is 0.01 to 5.0% by weight, preferably 0.1 to 1.0% by weight. When this concentration is over 5.0% by weight, the mold releasability tends to be lowered. And when under 0.01% by weight, the wettability to the mold tends to be lowered.

The dilution ratio of the mold releasing agent is preferably 2–100 times. In this case, the mold releasing agent is particuraly useful at 0.01 to 5.0% by weight as the diluted concentration, more preferably 0.1 to 1.0% by weight.

And, in the present invention, an anticorrosion agent can be added to the dilution agent, for example, the anticorrosion agent having the reduction ability such as sodium nitrite and so on or the anticorrosion agent of the surfactant group can be used, and concretely, Sanhibitor manufactured by Sanyo Kasei Co., Ltd. can be given.

THE POSSIBILITY OF UTILIZING THE INVENTION IN INDUSTRY

According to the molding method of the present invention, when the mold releasing agent is used for the molding after dilution by water, because the said mold releasing agent is diluted for using by the water solution containing the surfactant, the dilution agent contains the surfactant so that the wettability to the mold is improved, and the mold releasing agent does not form a drop-like shaped water so that it becomes uniform thin membrane state, and the drying ability can be improved as well as the mold releasability and the mold contamination can be improved.

Moreover, because the surfactant can be beforehand contained into the dilution agent in the optimal concentration, the dilution ratio (the dilution concentration) can always be set at the most desirable value, and the wettability to the mold would not change. Accordingly, it is possible to freely select the most suitable dilution ratio adjusted according to the difference of the molding composition or the shape of the mold, and the above wettability, the drying ability and the mold releasability can be always improved with good reproducibility.

BRIEF DESCRIPTION OF DRAWING

FIG. 1 is a graph in which water evaporation rate (drying ability) of the mold releasing agent is plotted as compared with the reference.

EMBODIMENTS

The present invention will be now explained in more detail with the following examples, but it would not be limited by these examples.

EXAMPLE 1

497 g of ion-exchanged water was put in 1 L of three-necked distillation flask, and heated at 40° C. by a water bath. 3 g of Nonion HS-210 (manufacutured by Nippon Oil and Fats Co.,Ltd.) having following structual formula was put in there, and stirred for 30 minutes and comletely dissolved. Thus obtained solution was named as a dilution agent(A).

Nonion HS-210

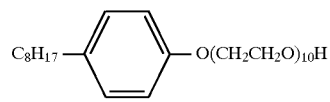

Next, 10 g of Daifree ME-414 (having 4% by weight of effective component, manufacutured by Daikin Industries Ltd.) as a fluorine-containing water-based mold releasing agent was taken in the 100 mL beaker, and 40 g of the dilution agent(A) was added there and stirred to prepare a solution of 5 times dilution ratio.

The below described Table 1 and FIG. 1 show the wettability to the metal mold, the drying time on the metal mold and the mold releasability when the solution of 5 times dilution ratio is used.

EXAMPLE 2

SH-7036 (having 38% by weight of effective component, manufacutured by Torey Dowconing Silicone Co., Ltd.) as a silicone-type water-based mold releasing agent was used instead of Daifree ME-414 as a fluorine-containing water-based mold releasing agent in the Example 1. 1 g of SH-7036 was taken in the 100 mL beaker and 46.5 g of the dilution agent(A) was added and stirred to prepare a solution of 47.5 times dilution ratio.

EXAMPLE 3

EMUSTER 0001 (having 40% by weight of effective component, manufacutured by Nippon Seirou Co., Ltd.) as a wax-type water-based mold releasing agent was used instead of Daifree ME-414 as a fluorine-containing water-based mold releasing agent in the Example 1. 1 g of EMUSTER 0001 was taken in the 100 mL beaker, and 49 g of the dilution agent(A) was added and stirred to prepare a solution of 50 times dilution ratio.

EXAMPLE 4

The same operation as the Example 1 was conducted, except using 5 g of Nonion HS-206 (manufacutured by Nippon Oil and Fats Co.,Ltd.) having a following structual formula instead of Nonion HS-210 in the Example 1.

Nonion HS-206

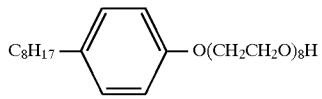

EXAMPLE 5

The same operation as the Example 1 was conducted, except using 1 g of Nonion HS-220 (manufacutured by Nippon Oil and Fats Co.,Ltd.) having a following structual formula instead of Nonion HS-210 in the Example 1.

Nonion HS-220

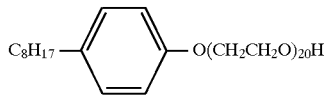

EXAMPLE 6

The same operation as the Example 1 was conducted, except using 1 g of the above Nonion HS-210 (manufacutured by Nippon Oil and Fats Co.,Ltd.) and 1 g of Nonion HS-215 (manufacutured by Nippon Oil and Fats Co.,Ltd.) having a following structual formula instead of Nonion HS-210 in the Example 1.

Nonion HS-215

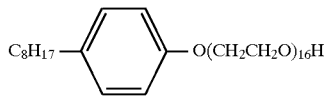

EXAMPLE 7

496g of ion-exchanged water was put in 1 L of three-necked distillation flask, and heated at 40° C. by the water bath. 3 g of Nonion HS-210 (manufacutured by Nippon Oil and Fats Co.,Ltd.) and a water-based anticorrosion agent of Sanhibitor No. 52 (manufacutured by Sanyo Kasei Industries Co., Ltd.) were put in there, stirred for 30 minutes and comletely dissolved. Thus obtained solution was named as a dilution agent(B).

Daifree ME-414 was diluted by 5 times by using the dilution agent(B) instead of the dilution agent(A) in the Example 1.

The below-described Table 1 shows the wettability to the mold, the drying time on the mold and the mold releasability to the 5 times dilution agent, and the below-described Table 2 shows a anticorrosion property on the metal.

And, the results of Example 1, Example 2, Example 3, Comparative Example 1, Comparative Example 2, Comparative Example 3, and Comparative Example 4 are shown in Table 2.

EXAMPLE 8

The same operation as the Example 7 was conducted, except using 2 g of sodium molybdate instead of 1 g of Sanhibitor No. 52.

Comparative Example 1

The same operation as the Example 1 was conducted, except using Daifree ME-414 which was 5 times diluted by ion-exchanged water instead of the dilution agent(A) in the Example 1.

Comparative Example 2

The same operation as the Example 2 was conducted, except using SH-7036 which was 47.5 times diluted by ion-exchanged water instead of the dilution agent(A) in the Example 2.

Comparative Example 3

The same operation as the Example 3 was conducted, except using EMUSTER 0001 which was 50 times diluted by ion-exchanged water instead of the dilution agent(A) in the Example 3.

EXAMPLE 9

The same operation as the Example 4 was conducted, except using

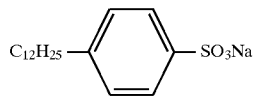

instead of Nonion HS-206 in the Example 4.

EXAMPLE 10

The same operation as the Example 5 was conducted, except using

instead of Nonion HS-220 in the Example 5.

EXAMPLE 11

The same operation as the Example 6 was conducted, except using

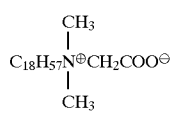

instead of Nonion HS-210 and Nonion HS-215 in the Example 6.

Comparative Example 4

The same operations as the Example 1 was conducted, except using Daifree ME-414 which was the original undiluted liquid instead of Daifree ME-414 which was 5 times diluted by ion-exchanged water in the Example 1.

EXAMPLES 12–22

The same operations as the Example 1 were conducted, except changing the blending amount of the surfactant and the mold releasing agent.

The results are shown in Table 1, Table 2, Table 3 and FIG. 1. The evaluation of each property was conducted as follows.

The wettability: it means the wetting state when the liquid was coated with a brush in a given amount on the inside of the mold (56 mm φ×10 mm) which was made of hard chromium-plated semi-hardsteel S45C.

The standard of the evalution:

○: the mold could be coated uniformly.

Δ: there were non-coated area in part.

X: there were many non-coated areas because the liquid was repelled.

The drying ability: the metal mold made of aluminium was set on the infrared water content measuring instrument in a room of constant temperature of 25° C. and constant humidity of 60%, constant amount of 0.4 g of the liquid was coated by a brush thereon, and the transition of the decreasing rate in weight (that is, evaporation rate of water) was plotted by a computer connected to the room. An example was shown in FIG. 1. Here, the evaluation of the drying time was divided to three stages for convenience.

The evaluation: drying time (minutes)

○: within 4 minutes

Δ: over 4 minutes and within 6 minutes

X: over 6 minutes

The mold releasability: the metal mold coated with the mold releasing agents by a brush which were used at the above wetting test was heated for 10 minutes at 120° C. in a drying oven. 20 g of epoxy resin having the following components was flowed there, and clips were leaned thereon and hardened under a condition of 120° C. and 2 hours. After left for 2 hours at room temperature, the releasing force was measured by a pulling test machine.

The component of epoxy resin:

| | |
|---|---|
| Epicoat 828 (manufactured by Shell Chemical Co., Ltd.) | 100 parts by weight |
| Triethylene tetraamine | 8 parts by weight |

Here, the evaluation of the releasing force was divided three stages for convenience.

The evaluation: the releasing force (g/cm$^2$)

○: under 200

Δ: over 200 and under 300

X: over 300

The corrosion degree

How to test 20 g of sample was set in 50 cc of a screw tube, and it was left at 25° C. and 65% in the constant temperature and constant humidity room in a condition that SS-400 steel (1.6×20×50 mm) that buffing was done on each facesides was leaned diagonally and half dipped.

The standard of decision

The corrosion degree was decided by way of eye observation according to following standards.

0: no-changed

1: red rust was a little generated on interface between liquid-gaseous phase.

2: red rust was generated also other than on interface between liquid-gaseous phase.

3: the corrosion was a little generated.

4: the corrosion was severe.

TABLE 1

| | concentration of the dilution agent (% by weight) | wettability | drying ability | mold releasability |
|---|---|---|---|---|
| Example | | | | |
| 1 | 0.6 | ○ | ○ | ○ |
| 2 | 0.6 | ○ | ○ | Δ |
| 3 | 0.6 | ○ | ○ | Δ |
| 4 | 0.99 | ○ | ○ | ○ |
| 5 | 0.2 | ○ | ○ | ○ |
| 6 | 0.4 | ○ | ○ | ○ |
| 7 | 0.6 | ○ | ○ | ○ |
| 8 | 0.6 | ○ | ○ | ○ |
| 9 | 0.99 | Δ | Δ | Δ |
| 10 | 0.2 | Δ | Δ | Δ |
| 11 | 0.4 | Δ | Δ | Δ |
| Comparative Example | | | | |
| 1 | 0 | x | x | Δ |
| 2 | 0 | x | x | x |
| 3 | 0 | x | x | x |

TABLE 2

| | corrosion degree | | | | |
|---|---|---|---|---|---|
| | 1 day after | 2 days afer | 3 days after | 7 days after | 14 days after |
| Example | | | | | |
| 1 | 1 | 3 | 3 | 4 | 4 |
| 2 | 1 | 3 | 3 | 4 | 4 |
| 3 | 1 | 3 | 4 | 4 | 4 |
| 7 | 0 | 0 | 0 | 0 | 0 |
| 8 | 0 | 0 | 0 | 0 | 0 |
| Comparative Example | | | | | |
| 1 | 1 | 3 | 3 | 4 | 4 |
| 2 | 1 | 3 | 3 | 4 | 4 |
| 3 | 1 | 3 | 4 | 4 | 4 |
| 4 | 0 | 1 | 2 | 3 | 4 |

TABLE 3

| Example | concentration of the dilution agent (% by weight) | blending amount of ME-414 (4% by weight) | concentration of HS-210 (% by weight) | blending amount of HS-210 | wettability | drying ability | mold releasability |
|---|---|---|---|---|---|---|---|
| 12 | 8.0 | 10 g | 8.0% | 40 g | ○ | ○ | x |
| 13 | 6.0 | 10 g | 6.0% | 40 g | ○ | ○ | x |
| 14 | 5.0 | 10 g | 5.0% | 40 g | ○ | ○ | Δ |
| 15 | 4.0 | 10 g | 4.0% | 40 g | ○ | ○ | Δ |
| 16 | 2.0 | 10 g | 2.0% | 40 g | ○ | ○ | Δ |
| 17 | 1.0 | 10 g | 1.0% | 40 g | ○ | ○ | ○ |
| 18 | 0.2 | 10 g | 0.2% | 40 g | ○ | ○ | ○ |
| 19 | 0.05 | 10 g | 0.05% | 40 g | Δ | Δ | Δ |
| 20 | 0.02 | 10 g | 0.02% | 40 g | Δ | Δ | Δ |
| 21 | 0.01 | 10 g | 0.01% | 40 g | Δ | Δ | Δ |
| 22 | 0.005 | 10 g | 0.005% | 40 g | Δ | x | Δ |

From the results of above Table 1 and FIG. 1, Table 3, and as shown in Examples 1–22 (partiouraly Examples 1–8, 14–21), the mold releasing agent diluted by the dilution agent according to the present invention can improve the wettability, the drying ability and the mold releasability. And, from the results of Table 2, and as shown in Examples 7 and 8, there is a sufficient effect by adding the anticorrosion agent.

What is claimed:

1. A preparation method comprising first preparing a dilution agent consisting essentially of a water solution containing 0.01 to 1.0% by weight of a surfactant and thereafter diluting a mold releasing agent with the dilution agent at the time of use in a molding process.

2. The preparation method as defined in claim 1, in which a nonionic surfactant is used as the surfactant.

3. The molding method as defined in claim 2, in which the nonionic surfactant is shown as the general fomula:

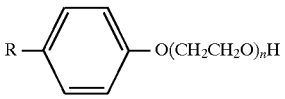

(R is an aliphatic hydrocarbon group represented as $C_mH_{2m+1}$ (m is 5–20 of integral number), n is 2–100 of integral number).

4. The preparation method as defined in any one of claims 1, 2 or 3 in which a dilution ratio of the mold releasing agent is set at 2 to 100 times by adjustment of concentrations of the dilution agent.

* * * * *